United States Patent
Lawrence et al.

(10) Patent No.: US 7,535,402 B1
(45) Date of Patent: May 19, 2009

(54) NAVIGATION WITH SATELLITE COMMUNICATIONS

(75) Inventors: David G. Lawrence, Mountain View, CA (US); Michael L. O'Connor, Redwood City, CA (US)

(73) Assignee: Novariant, Inc., Fremont, CA (US)

( * ) Notice: Subject to any disclaimer, the term of this patent is extended or adjusted under 35 U.S.C. 154(b) by 307 days.

(21) Appl. No.: 11/108,194

(22) Filed: Apr. 18, 2005

Related U.S. Application Data

(60) Provisional application No. 60/563,395, filed on Apr. 19, 2004.

(51) Int. Cl.
    G01S 7/36    (2006.01)
    G01S 5/14    (2006.01)
    H04B 7/185   (2006.01)

(52) U.S. Cl. ............... 342/20; 342/357.03; 342/357.01

(58) Field of Classification Search ............. 342/357, 342/20, 357.01, 357.03; 701/214, 207
    See application file for complete search history.

(56) References Cited

U.S. PATENT DOCUMENTS

| | | | |
|---|---|---|---|
| 4,751,512 A | 6/1988 | Longaker | |
| 5,323,322 A | 6/1994 | Mueller et al. | |
| 5,491,636 A | 2/1996 | Robertson et al. | |
| 5,510,798 A | 4/1996 | Bauer | |
| 5,621,646 A * | 4/1997 | Enge et al. | 701/120 |
| 5,764,184 A * | 6/1998 | Hatch et al. | 342/357.02 |
| 5,828,336 A * | 10/1998 | Yunck et al. | 342/357.02 |
| 5,841,398 A * | 11/1998 | Brock | 342/357.02 |
| 5,867,411 A * | 2/1999 | Kumar | 708/300 |
| 6,029,111 A * | 2/2000 | Croyle | 701/207 |
| 6,040,798 A * | 3/2000 | Kinal et al. | 342/357.01 |
| 6,324,473 B1 * | 11/2001 | Eschenbach | 701/215 |
| 6,356,232 B1 * | 3/2002 | Rocken et al. | 342/357.02 |
| 6,373,432 B1 * | 4/2002 | Rabinowitz et al. | 342/357.16 |
| 6,377,881 B1 | 4/2002 | Mullins | |
| 6,531,981 B1 * | 3/2003 | Fuller et al. | 342/357.03 |
| 6,542,820 B2 | 4/2003 | LaMance et al. | |
| 6,549,846 B1 * | 4/2003 | Dance et al. | 701/207 |
| 6,560,534 B2 | 5/2003 | Abraham et al. | |
| 6,670,915 B1 * | 12/2003 | McBurney et al. | 342/357.12 |
| 6,707,424 B1 * | 3/2004 | Snyder et al. | 342/357.14 |
| 2003/0233030 A1 * | 12/2003 | Rice | 600/300 |
| 2004/0006424 A1 * | 1/2004 | Joyce et al. | 701/207 |
| 2004/0145517 A1 * | 7/2004 | Kinal et al. | 342/357.02 |

(Continued)

OTHER PUBLICATIONS

Herbert Kramer, Observation of the Earth and its Environment, 2002, Springer, 3rd edition, p. 156 & 185 http://books.google.com/books?id=4JucM8bpLbEC&pg=PA156&lpg=PA156&dq=leo+broadcast+navigation&source=web&ots=G-fALDdb9m&sig=Rdja9fPMRgh77Av0Pc2R6UwLtql#PPA185,M1.*

(Continued)

*Primary Examiner*—Thomas H Tarcza
*Assistant Examiner*—Harry Liu
(74) *Attorney, Agent, or Firm*—Brinks, Hofer, Gilson & Lione

(57) ABSTRACT

A Low Earth Orbiting (LEO) satellite is used for broadcasting differential navigation corrections. Using LEO satellites, the "footprint" of the beam is much smaller than for geosynchronous satellites, and therefore data link bandwidth requirements are reduced to sufficiently cover an entire area. With a LEO satellite transmitting in multiple beams, these footprints become even smaller. Corrections targeted to such a small area could have the form of local area corrections (for example, raw measurements taken from a navigation reference station) using the LEO satellites.

23 Claims, 1 Drawing Sheet

U.S. PATENT DOCUMENTS

2004/0166801 A1* 8/2004 Sharon et al. .............. 455/12.1
2004/0203850 A1* 10/2004 Oesterling ............... 455/456.1
2005/0114022 A1* 5/2005 Podshivalov et al. ........ 701/213

OTHER PUBLICATIONS

Changdon Kee. *Wide Area Differential GPS*. 1994. pp. 81-85. Standford, California.

Satellite Journal International. *Satellite News NA V1.5*. Apr. 14, 2005. <http://www.sat-net.com/listserver/sat-na/msg00016.html>.

C. Rizos, T. Yan, S. Omar, T. Musa, D. Kinlyside. *Implementing Newtwork-RTK: The SydNET CORS Infrastructure*. The 6th International Symposium on Satellite Navigation Technology Including Mobile Position & Location Services. Jul. 22-25, 2003. Melbourne, Australia.

Orbiter and Radio Metric Systems Group. *Real-Time GIPSY Software*. Apr. 14, 2005. <http://gipsy.jpl.nasa.gov/orms/rtg/index.html>.

OmniSTAR USA, Inc. *OmniSTAR—How It Works*. Apr. 14, 2005. <http://www.omnistar.com/howitworks.html>.

USPTO Office Action dated Aug. 7, 2008 for related U.S. Appl. No. 11/108,336.

* cited by examiner

NAVIGATION WITH SATELLITE COMMUNICATIONS

RELATED APPLICATIONS

The present patent document claims the benefit of the filing date under 35 U.S.C. §119(e) of Provisional U.S. Patent Application Ser. No. 60/563,395, filed Apr. 19, 2004, which is hereby incorporated by reference.

BACKGROUND

Many DGPS corrections networks exist, including FAA WAAS, OmniStar, JPL, USCG Beacons, local commercial networks, local community cooperatives networks, and local government funded networks. In the above examples, the deployment and maintenance of the reference station hardware is funded in one of the following ways: the government, commercially (paid for by subscriptions from users), commercially (deployed to incentivize sales of roving units) or margins on roving units pay for reference network privately.

BRIEF SUMMARY

As satellite navigation and satellite communications both increase in use, there is significant value to be gained by combining these technologies into a single device. The inventors hereby disclose such a device.

The present invention is defined by the following claims, and nothing in this section should be taken as a limitation on those claims. Further aspects and advantages of the invention are discussed below in conjunction with the preferred embodiments.

BRIEF DESCRIPTION OF THE DRAWINGS

The components and the FIGURES are not necessarily to scale, emphasis instead being placed upon illustrating the principles of the invention. Moreover, in the FIGURES, like reference numerals designate corresponding parts throughout the different views.

DETAILED DESCRIPTION OF THE DRAWINGS AND PRESENTLY PREFERRED EMBODIMENTS

Figure 1:
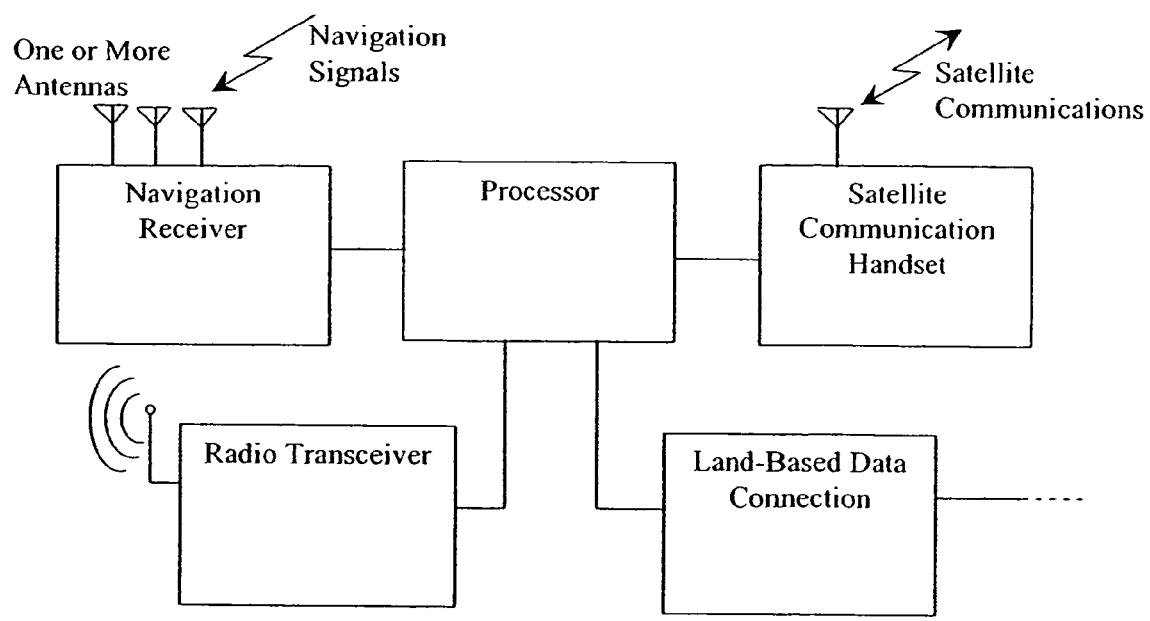
FIG. 1 is one embodiment of a device that includes a navigation receiver and a handset for satellite communications.

Device Comprising a Navigation Receiver and a Satellite Communication Handset FIG. 1 shows a device in a single enclosure or a set of enclosures that includes a navigation receiver with one or more antennas, a handset for satellite communication, and a processor, such as a computer, to connect to the two devices and transmit data between them. The device may have any number of additional components, including a radio transceiver and a land-based data connection.

The navigation receiver is capable of determining the location of the antennas attached to it. It may be capable of tracking one or more of the following signal sources: GPS L1 signals, GPS L2 signals, GPS L5 signals, GLONASS signals, GALILEO signals, pseudolite signals at any frequency, synchrolite signals at any frequency. The receiver could track a number other signals, as should be very apparent to one skilled in the art upon reading this disclosure. The preferred embodiment for this device contains an IntegriNautics Quasar GPS L1+L2 receiver.

The satellite communication handset is capable of communicating with a satellite to transmit and receive data, such as navigation receiver correction data, location information, voice, or video. It may be an Iridium, Globalstar, or Inmarsat handset, or equivalent. The preferred embodiment for this device contains a Qualcomm Iridium handset.

The processor is capable of communicating with the navigation receiver and the satellite communication handset, and transferring data between them. The specific details of data transfer can be set by the software in the processor, or can potentially be controlled by users of the device. Such control may be performed through the other components of the system, such as a user communicating with the satellite communication handset, or by a direct connection to the processor. The processor may a computer, a microcontroller, or equivalent. The processor could be dedicated to this function, or it should be utilized to perform other functions as well. For example, it could be a part of either the navigation receiver or the satellite communication handset. In the preferred embodiment, it is an embedded Intel x86 computer in a PC-104 form factor.

The optional radio transceiver can be used to transmit or receive messages through a wireless connection with other devices. It could be a radio modem, cellular telephone, "wi-fi"-type wireless communication system, or equivalent. The preferred embodiment for this device contains a Freewave 900 MHz band radio modem, which communicates GPS differential corrections to users who require such signals for improved system accuracy or integrity.

The optional land based data connection can be used to transmit or receive messages to other devices. As an example, it could be an internet connection through a modem, DSL, cable modem, ISDN line, fiber optic line, or equivalent. As another example, it could also be a direct modem connection.

Means for Using a Device Comprising a Navigation Receiver and a Satellite Communication Handset:

One means for using the device described above is to use it as a differential navigation reference station. The device collects navigation measurements, and communicates these measurements to other users of the same navigation signals, or to a central control station which processes these measurements and then transmits them to other users.

Such reference stations are typically either "Local Area" reference stations, or "Wide Area" reference stations. Local Area reference stations use a radio transmitter or radio transceiver to send corrections directly to other users. Wide Area reference stations use a land-based data connection to send corrections to a central control station. This central control station processes the data, and this processed data is transmitted to the entire wide area.

Local Area type corrections are, with little or no "Wide Area" processing, transmitted over a satellite link to users. In such a system, data bandwidth over the satellite is critical. As the number of navigation reference stations increase and the network becomes geographically dense, a means must be introduced to choose which reference station corrections will be transmitted to the users.

One solution is to allow the user to contact the network (for example, through a satellite communication handset) and request a specific reference station for a certain period of time. This allows the user to ensure that the nearest reference station is used, which will typically provide the best overall navigation system performance.

Another novel solution is to allow the users to report only their locations to the network (for example, through a satellite communication handset), and allow the network to determine the best set of reference station signals to transmit based on the locations of the active users. One way to implement this would be to compute, for each possible reference station set, the sum of the square of the distance from each user to the nearest included reference station. The optimal set is then chosen to be the set that minimizes the sum of the square of these distances. Weightings could also be applied in order to favor some users over other users. Countless other ways to implement this method are also possible.

Another solution requires no reports from the users. At frequent intervals, the network looks at the area in range of satellite coverage (this area will be changing quickly for a LEO satellite), determines which reference stations are healthy and transmitting, and chooses the set that provides the most even distribution throughout the region of coverage.

Another solution chooses the reference stations which are nearest to a specific point or set of points. For example, the network may choose the reference stations which lie closest to the center of major cities. One way to implement this would be to choose the set that minimizes the sum of squares of the distances from reference stations and selected points (as described above). Countless other ways to implement this method are also possible.

Another solution allows the network to vary its weighting functions with time. For example, the system may favor reference stations near major highways during high traffic commuting hours, or coastal reference stations during nighttime hours. The system may also favor reference stations in farming areas during critical planting and harvesting seasons.

Business Models, and Examples for a DGPS Network and a Method to Deploy and Maintain that Network:

The network comprises some of the following elements:

Base stations provided to customers with low or negative margins (possibly even paying the customer to take the base station), Real-time data from customer sites is made accessible to other customers via satellite dissemination. Optionally the real-time data is also broadcast via terrestrial data link. Optionally the real-time data is also accessible to the network provider (in certain embodiments, the dissemination would be handled by the satellites and not necessarily ever sent back to the satellite ground stations. For example, a satellite could act like a repeater, rebroadcasting the signal on the beam from which the signal was received and optionally on adjacent beams as discussed below). Optionally, the real-time base station data satellite dissemination is done entirely through satellite communication. Optionally, the base station is connected to a land-line in the form of an analog or digital phone line, an Ethernet, or other wire-based communication means or combinations thereof.

LEO Per-beam corrections—LEO communication satellites often have several antenna beams each focused on different regions of the satellite's overall footprint. Each beam might service an area on the order of 100 times less than the footprint of a GEO used for GPS correction data. Therefore, correction data can be locally optimized to provide corrections applicable to users in that beam.

Until a sufficient number of base stations are available, it will not be possible to independently observe different navigation error sources. For example, ephemeris errors and satellite clock errors might have a similar signature from a small number of nearby base stations. Fortunately, users in the region don't care about independent corrections. If the independent error sources are unobservable by nearby surrounding base stations, they can be lumped together to form a correction that is good for the local region. However, WAAS and other existing low-latency ephemeris corrections can be used to augment the base station network to provide improved ephemerides.

Example 1

Base stations with L1/L2 receivers, satellite data modem, terrestrial data link, and data storage. Base stations with L1/L2 receivers, satellite data modem, terrestrial data link, and data storage are provided to customers in regions lacking critical density of base stations at cost (*). In return, the customer provides power and a good base station installation site. After installation, the base station collects tens of hours of GPS L1/L2 data and also listens for nearby base stations through its terrestrial data link. It then decimates and/or compresses and/or pre-processes the data and sends it to a central processing facility via a (free) satellite data call. This call registers the precise location and phone number of the new base station and optionally information about data reception quality from nearby base stations. It may also calculate local multipath estimates versus azimuth and elevation. Although the multipath environment may change due to motion of vehicles, weather and other effects, a feed-forward initial multipath model can improve the code phase measurements from the base station. This can be applied at the base station or at a separate processing facility. The model can be refined with time.

After the registration process, the base station broadcasts DGPS corrections through its terrestrial data link and awaits a command via satellite data modem to send its corrections (and possibly those of its neighbor(s)) through the satellite data modem in an efficient compressed format (the efficiency of this compressed format can be improved by listening to corrections coming from the satellite and providing information that is not redundant). Some base stations may be commanded to send continuous real-time information while others might be queried periodically to allow cycle ambiguities to be handed off through the network of base stations and/or to refine an atmospheric model. Base stations that are observed to be in regions of faster changing atmospheric delays (for example, stations along a weather front) might be queried more frequently than those in more stable regions. The periodic queries could ask for data at a time or times other than the time of the query. For example, base stations A, B, C, and D might be asked for navigation observations for times $t=0$ and $t=10$ at $t=11$, $t=12$, $t=13$, and $t=14$ respectively. In another embodiment, instead of sending navigation observations, each base station might send corrections to atmospheric delay and delay rate models broadcast from the satellite based on navigation observations it has recently made. In another embodiment, combinations of navigation observables and atmospheric model parameters might be sent from the base station.

Base station integrity monitoring—improper installation of base stations could lead to bad differential corrections. Due to the "plug-and-play" nature of these base stations, the quality control of installations may not be as high as for lower density base station networks. The data collected during registration will monitor signal strength profiles and phase residuals to look for obstructions, excessive multipath, and antenna motion. The base station can self-monitor itself thereafter and report when it detects a potential problem.

Base station software upgrades can be broadcast via satellite communications and swapping to new software can be triggered via satellite broadcast command.

Two mechanisms are provided for recovering even this nominal expense. First, the charge is waived with a subscription to the satellite correction service. Second, operators of base stations will receive a fraction of local subscription revenue.

Example 2

Base stations with L1/L2 receivers, phone modem, terrestrial data link, data storage, and optional Ethernet. This example is similar to the first example except a dedicated phone land-line is connected to the base stations, and no satellite communication is necessary from the base station. The phone connection is used in two modes. In one mode, a direct phone connection is made between the base station and the central processing facility (there could be multiple "central" processing facilities) to get real-time data for dissemination through the satellite network. In a second mode of operation, the base station connects to a local ISP dialup service and establishes an internet connection. It awaits commands via the internet to switch to the (presumably more reliable and lower latency) direct connection mode. The central processing facilities monitor data from the "hot spare" base stations and adaptively choose which base stations to switch to real-time direct connection mode.

The dual mode complexity allows more base station network scalability without the need for scaling up the phone and modem bank infrastructure at the central processing facilities. In both modes of operation, an internet connection can be provided on an Ethernet port to the base station maintainer. In the direct connection mode, the central processing facilities can act as the ISP in addition to collecting correction data. This may incentivize the maintainer to pay for the dedicated phone line and ISP.

Subscription Options Include:

Flywheel subscription—for users that operate close to local base stations, a special subscription model is provided. If a user elects this subscription model, the subscription rate is lower, but they can only use the satellite service to flywheel through outages in local coverage due to terrestrial data link outages. Optionally, one roving unit per base station could be enabled for an even lower or free flywheel subscription fee to further incentivize base station deployment. Matching the rover with the base station could be done in several ways. For example, an encrypted feature code generated by the service provider as a function of the rover and base station serial numbers could be entered into the rover to enable it for a free flywheel subscription. The service provider could make sure that only one feature code per base station is provided and provided to the rightful owner of the base station.

Redundant subscription-two subscription-based services could both be used to provide improved accuracy and redundancy. Reduced rate subscriptions could be offered by one or both providers to account for the fact that user demand for a second service is significantly lower than for the first service.

Flat rate plus per use subscription-instead of or in addition to a flat subscription rate for a given time period, a per-use subscription could be offered. For example, a six month subscription might cost $300 plus $1/hour of active use.

Regional/seasonal subscription rates-based on knowledge of regional terrestrial DGPS solutions and other customer demand factors, rates could be adjusted regionally/seasonally to account for variations in demand. A per-hour fee (rather than a flat annual fee) could change with time and location. The burn-rate could be displayed to the user and a warning could be displayed to the user when their burn rate changes.

Operation specific subscriptions-due to differing economics, different operations may have vastly different financial benefits. For example, a farmer might benefit less than a construction surveyor. Because the products used in these two operations will typically be different, the subscription burn rate could be a function of the product. Additionally, even in the same product, the burn rate could be adjusted based on the mode of operation. For example, a farm autosteering system with a very wide implement configured might burn subscription at a slower rate than the same product configured to use a narrow implement.

Satellite coverage-due to factors such as satellite/satellite beam failures or signal obstruction, there may be brief periods when satellite corrections are not available. In a coverage prediction feature, most outages resulting from satellite problems can be predicted in advance. The feature to predict outages could be used to plan operations to be in regions where terrestrial data link coverage is solid when satellite corrections are unavailable. Outages resulting from physical obstructions can be potentially avoided based on knowledge of communication satellite positions. For example, operations near obstructions could be avoided at times when the communication satellite planes are low on the horizon.

Fallback modes—for LEO satellites, outages caused by satellite failures should be very brief During these periods, a user can fall back to WAAS, a terrestrial data link if available, or other free or subscription-based satellite dissemination services.

Non real-time data services—depending on the data storage capacity at the base stations, navigation observables can be stored for tens of hours to several weeks. This data could be made available for post processing. This access could be free and require proprietary software to process or it could be offered for a download fee. If internet access is available at the base stations, the data could be accessed via the internet. After a certain delay, (say one week), the data could be offered for free to researchers.

ALADIN business model: pay for use if not near your base, else free; base station location registering mechanism; method to match vehicle and base station; and provider offers base at lower price in exchange for data (possibly even free, or even pay user to do it). The power of this concept is that correction data is specific to the beam from satellite. With a Geosynchronous satellite (GEO) such as used by FAA WAAS, the "footprint" of the satellite is so large that local area type corrections cannot all be transmitted through the limited bandwidth data link. With a Low Earth Orbiting (LEO) satellite, the "footprint" is much smaller, and therefore data link bandwidth requirements are reduced to sufficiently cover an entire area. With a LEO satellite transmitting in multiple beams, these footprints become even smaller. Corrections targeted to such a small area could have the form of local area corrections (for example, raw measurements taken from a navigation reference station).

The above discussion describes a system that can be used by itself, or in conjunction with one or more of the following systems: FAA WAAS, OmniStar, JPL, USCG Beacons, a local private reference station, local commercial networks, local community cooperatives networks, local government funded networks, Pseudolite transmitters, or Other LEO networks.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A system comprising:
   a reference station network operable to determine navigation measurements from a plurality of reference stations in the network, cycle ambiguities associated with multiple ones of the reference stations of the network; and
   a low earth orbit satellite operable to broadcast the navigation measurements from the plurality of reference stations in the network over a satellite beam to a plurality of users, the broadcast being over a footprint of the beam;
   wherein the reference stations comprise differential navigation reference stations in the network;
   wherein the low earth orbit satellite also is operable to broadcast with the satellite navigation measurements from the differential navigation reference stations, the network being operable to reduce a data bandwidth over the satellite link;
   wherein the data bandwidth reduction is achieved by excluding redundant information by at least one of the reference stations, which monitor the measurements from other reference stations; and
   wherein integrity of operation of the reference stations is monitored.

2. The system of claim 1 wherein the low earth orbit satellite is operable to rebroadcast the navigation measurements on the beam.

3. The system of claim 2 wherein the corrections are disseminated from the reference stations to the users entirely through satellite communications.

4. The system of claim 1 wherein the reference stations are operable to transmit the navigation measurements to a central processing facility, the central processing facility being operable to transmit the navigation measurements to the low earth orbit satellite for broadcast.

5. The system of claim 1 wherein the low earth orbit satellite is operable to broadcast on a plurality of beams, each beam including different correction data as a function of beam.

6. The system of claim 1 wherein the navigation measurements comprise GPS differential corrections, and where the reference stations comprise radio transceivers operable to communicate GPS differential corrections to local users.

7. The system of claim 1 wherein the broadcast navigation measurements comprises differential corrections.

8. The system of claim 7 wherein one or more antennas are connected to each of the reference stations, and wherein the reference stations are operable to determine locations of the one or more antennas.

9. The system of claim 1 wherein the data bandwidth reduction is achieved by reducing transmitted corrections from collected corrections.

10. The system of claim 1 wherein the data bandwidth reduction is achieved by choosing a subset of reference station corrections to transmit in the beam.

11. The system of claim 1 wherein the data bandwidth is reduced by applying weighting functions to differential navigation reference stations.

12. The system of claim 1 wherein one of the reference stations is operable to monitor the integrity of operation.

13. The system of claim 12 wherein monitoring integrity of operation comprises monitoring signal strength profiles.

14. The system of claim 12 wherein monitoring integrity of operation comprises monitoring phase residuals between the reference stations.

15. The system of claim 1 wherein the measurements are sent directly to users without a central control station.

16. The system of claim 1 wherein the reference stations of the network listen for nearby reference stations.

17. The system of claim 1 further comprising a roving unit of one of the users operable to receive the measurements terrestrially and from the low earth orbit satellite.

18. The system of claim 12 wherein the reference stations comprise more than one antenna.

19. The system of claim 1 wherein the at least one of the reference stations is operable to output only information that is not redundant.

20. The system of claim 1 wherein the reference stations comprise dual frequency receivers operable to receive ranging signals at more than one frequency.

21. The system of claim 1 wherein the network is operable to provide the navigation measurements both terrestrially and through the broadcast with the low earth orbit satellite.

22. The system of claim 1 wherein the network includes other pluralities of reference stations for other LEO satellites, respectively, at a given time.

23. A system comprising:
   a reference station network operable to determine navigation measurements from a plurality of reference stations in the network, cycle ambiguities associated with multiple ones of the reference stations of the network;
   terrestrial communication links operable to transmit the navigation measurements from the plurality of reference stations in the network to a plurality of users;
   wherein the reference stations comprise differential navigation reference stations in the network;
   wherein the network being operable to reduce a data bandwidth over the terrestrial communications link, where the data bandwidth reduction is achieved by excluding redundant information by at least one of the reference stations, which monitor the measurements from other reference stations;
   wherein integrity of operation of the reference stations is monitored; and
   wherein the measurements are sent to users without routing through a central control station.

* * * * *